J. E. BENNETT.
MACHINE FOR GRINDING SAUSAGE MEAT.
APPLICATION FILED JUNE 13, 1919.
1,435,796. Patented Nov. 14, 1922.
5 SHEETS—SHEET 2.
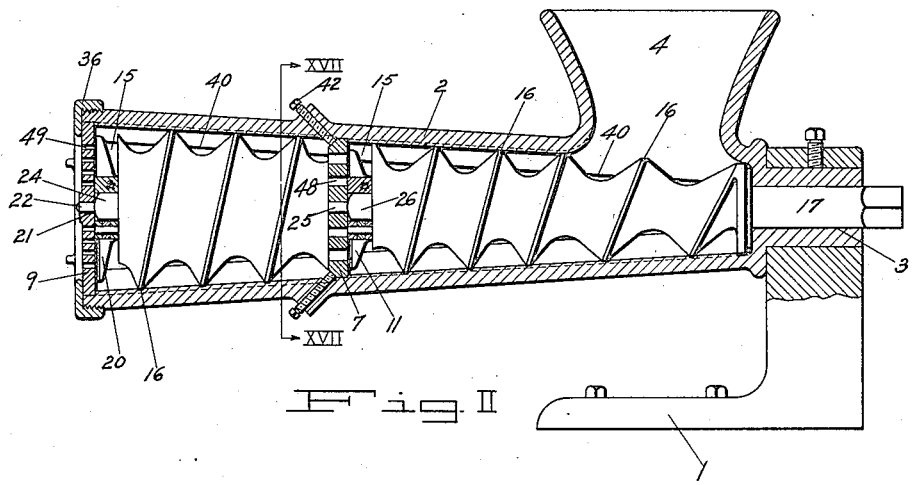
Fig. II
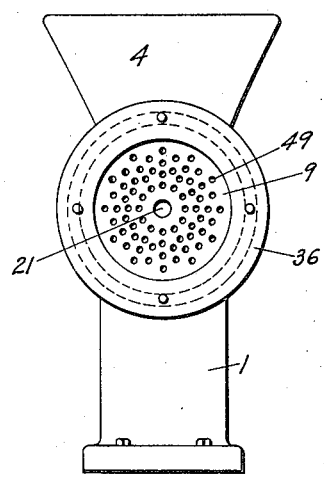
Fig. XVIII
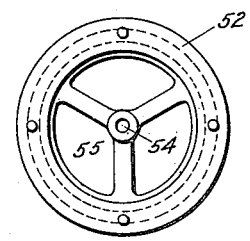
Fig. XIX
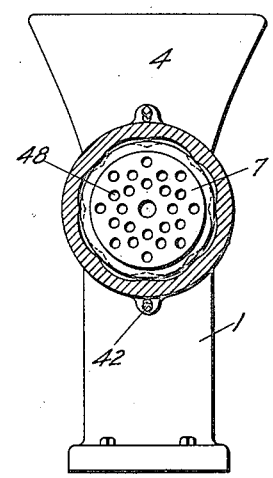
Fig. XVII
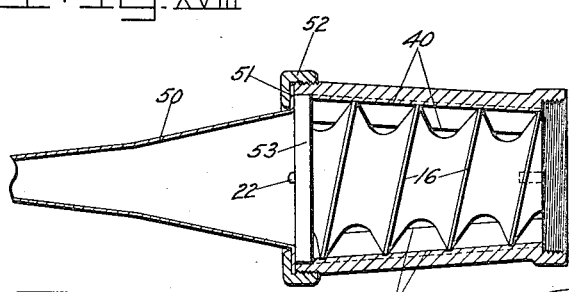
Fig. IV
Inventor:
Jacob E. Bennett,
By
Joseph F. Pitkins
Attorney.

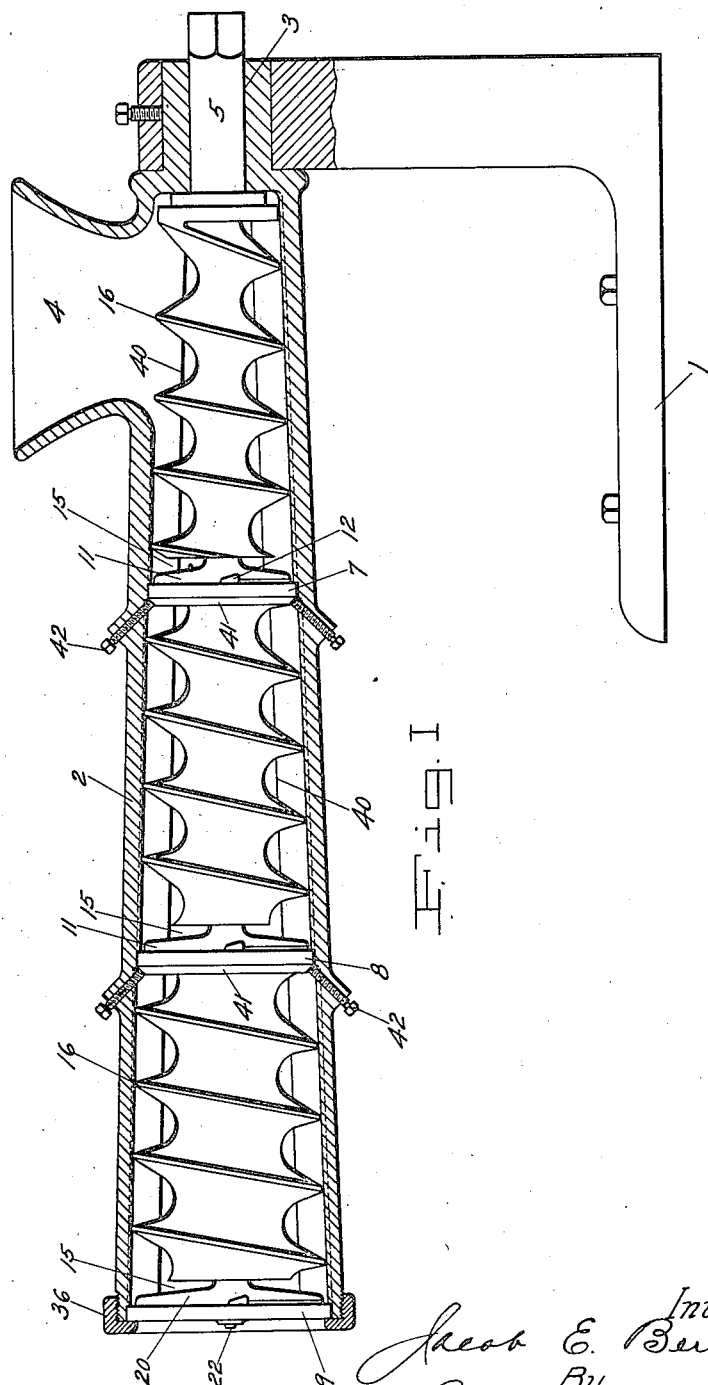

J. E. BENNETT.
MACHINE FOR GRINDING SAUSAGE MEAT.
APPLICATION FILED JUNE 13, 1919.
1,435,796.
Patented Nov. 14, 1922.
5 SHEETS—SHEET 3.
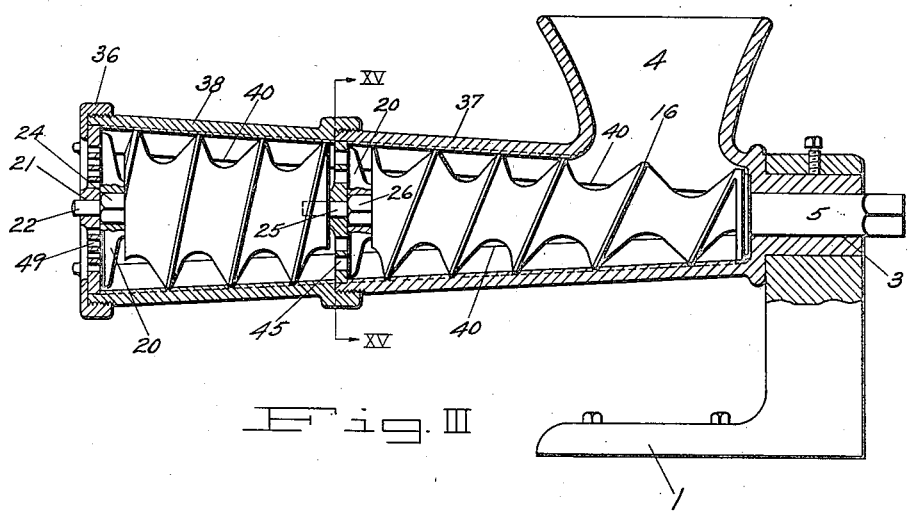
Fig. III
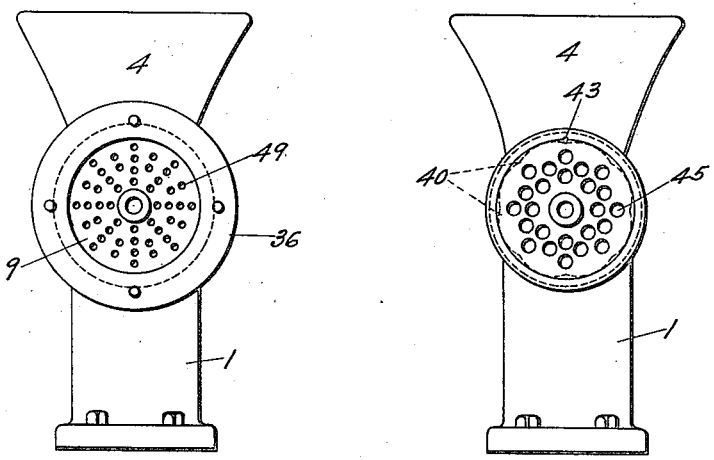
Fig. XVI
Fig. XV
Inventor:
Jacob E. Bennett
By
Joseph F. Atkins,
Attorney.

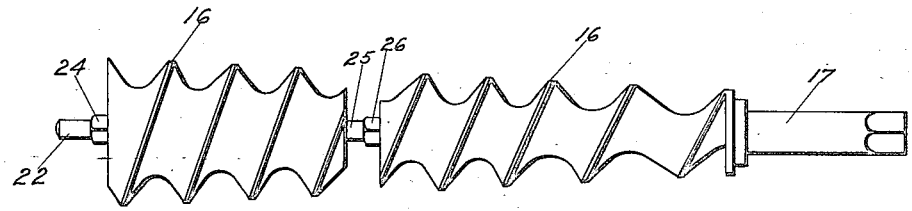
Fig. V
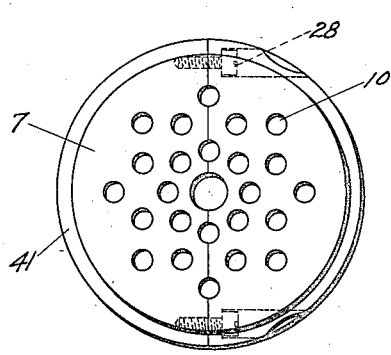
Fig. XX
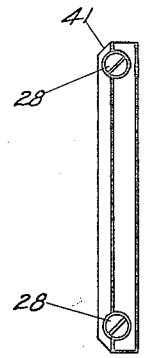
Fig. XXI
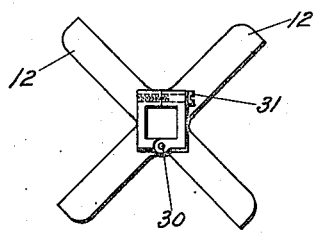
Fig. XXII
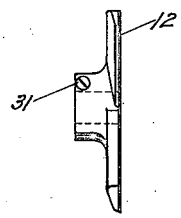
Fig. XXIII J. E. BENNETT.
MACHINE FOR GRINDING SAUSAGE MEAT.
APPLICATION FILED JUNE 13, 1919.
1,435,796.
Patented Nov. 14, 1922.
5 SHEETS—SHEET 5.
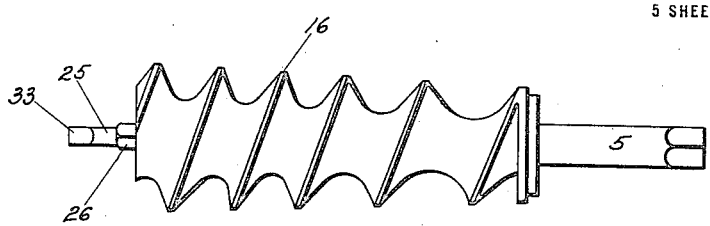
Fig. VI
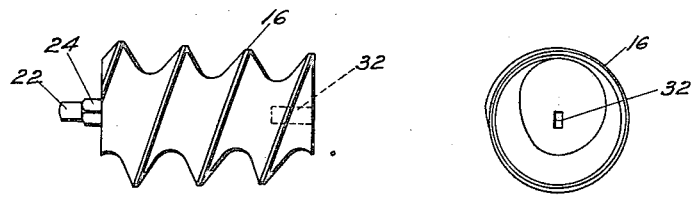
Fig. VII        Fig. VIII
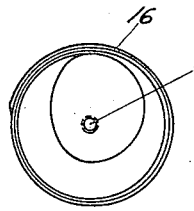  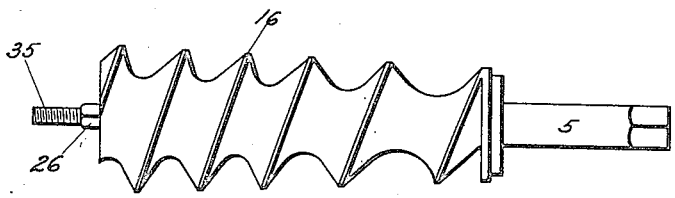
Fig. X        Fig. IX
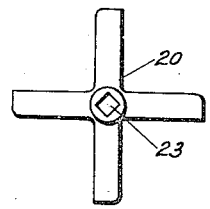   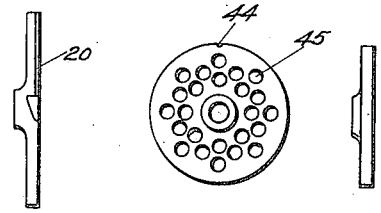
Fig. XI    Fig. XII   Fig. XIV   Fig. XIII
Inventor:
Jacob E. Bennett,
By
[signature]
Attorney.

Patented Nov. 14, 1922.

1,435,796

UNITED STATES PATENT OFFICE.

JACOB EVERETT BENNETT, OF PORTLAND, OREGON.

MACHINE FOR GRINDING SAUSAGE MEAT.

Application filed June 13, 1919. Serial No. 303,818.

*To all whom it may concern:*

Be it known that I, JACOB EVERETT BENNETT, a citizen of the United States of America, and resident of the city of Portland, in the county of Multnomah, in the State of Oregon, have invented certain new and useful Improvements in Machines for Grinding Sausage Meat, of which the following is a specification, reference being had to the accompanying drawings.

My invention relates to the art of grinding sausage meat or the like and has for its object improvements in machines for effecting the improvements in the art proposed.

In the art referred to, it has heretofore been the practice to cut the material to be ground into strips or pieces of a size only small enough to admit of their introduction, one by one, into the hopper of a sausage cutting or grinding machine in which they receive an initial cutting or grinding treatment that reduces the said strips or pieces to substantially uniform and smaller dimensions, it being impracticable to reduce the meat to requisite fineness in one grinding. Next, the ground product of the first treatment, having been discharged into a temporary container, is removed therefrom by hand and subjected to a second or to repeated cutting or grinding treatments as the case may be until the finished product arrives at the desired degree of reduction in respect to the size of the particles composing the mass, and at a proper commingling of the various ingredients employed.

By my invention all handling hitherto necessary of the material is, to great sanitary advantage, eliminated except that which is required in the preparation and initial feeding of the meat in strips into the hopper as above set forth; a gradual reduction through repeated reductions of the material to desired fineness is effected in one continuous operation; and a large economy of power, time, and labor is accomplished. Moreover, it is a fact well recognized in practice that whereas the meat introduced in the first cutting or grinding of it, in comparatively large strips, is driven through the machine with a positive, effectual and certain forward drive sufficient to overcome all resistance opposed to its progress, all cutting or grinding operations subsequent to the first has hitherto necessitated the driving of the material into the hopper of the cutting or grinding machine by outside aid, ordinarily obtained by use of a pin under impact of a mallet manipulated by an operator. The necessity referred to appears to arise from the diminished size of the particles, their compactness in mass, and their increased lubricity consequent upon the initial cutting or grinding operation upon them. Consequently in any cutting or grinding operation after the first, the plastic mass of material produced by the initial or subsequent cutting or grinding operations instead of responding to the forward drive of the feed screw of the cutting or grinding machine against the resistance opposed to its progress, slips upon the blades of the screw and finds their driving function ineffectual without the application of additional driving means of some sort.

By my invention the necessity at all times of any driving instrumentality except that of the feed-screw of the machine is eliminated. There being but one feed of meat to the machine necessary, and that being in the form of large strips or pieces above referred to which will not slip on the feed-screw, the feed-screw is thereby enabled without assistance to do the entire work of feeding the machine in one operation from start to finish throughout all the reductions that take place in said operation. At the same time, safety in operation of the machine is greatly promoted.

Those improvements in the art above indicated I accomplish through the instrumentality of improved mechanism that operates in accordance with the principles above indicated, and which is designed and adapted to carry them into effect.

What constitutes my invention will be hereinafter specified in detail and succinctly set forth in the appended claims.

In the accompanying drawings, Fig. I is a longitudinal, vertical, axial section, partly in elevation, of the present preferred form of embodiment of my invention in a triple reduction machine.

Fig. II is a similar view of a duple reduction machine, showing, as does Fig. I, a single piece feed-screw and barrel.

Fig. III is a view similar to Fig. II showing a modification thereof in respect to a sectional barrel and feed-screw.

Fig. IV illustrates in side elevation a sausage stuffer terminal-fixture that is applicable to any of my machines, and is illustrated as attached to tail-sections of the barrel and feed-screw, respectively, as shown in Fig. III, said barrel being shown in longitudinal section and the feed-screw in side elevation.

Fig. V illustrates in side elevation the single piece feed-screw shown in Fig. II detached.

Fig. VI shows in side elevation the head-section of a two part feed-screw as shown in Fig. III.

Fig. VII shows a similar view of the tail-section of said feed-screw, last named.

Fig. VIII is an elevation of one end of the subject matter of Fig. VII.

Fig. IX is a view similar to Fig. VI showing a slightly modified form of feed-screw head-section.

Fig. X is an end view of a corresponding tail-section.

Fig. XI is a front elevation of a cutter-blade detached.

Fig. XII is an edge view of the said cutter-blade detached.

Fig. XIII is an edge view of a perforated reduction-plate, detached.

Fig. XIV is a front elevation of the plate shown in Fig. XIII.

Fig. XV is a transverse section on the line XV—XV of Fig. III.

Fig. XVI is an end elevation of the subject matter of Fig. III taken at right angles thereto and looking towards the end of its barrel.

Fig. XVII is a view similar to Fig. XV but taken substantially on line XVII—XVII of Fig. II.

Fig. XVIII is is a view similar to Fig. XVI of the subject matter of Fig. II.

Fig. XIX is a front elevation of the discharge plate shown in Fig. IV, detached.

Fig. XX is a front elevation of a detached split reduction-plate, applicable to the continuous form of feed-screw shown in Fig. I or Fig. II.

Fig. XXI is an edge view of the same.

Fig. XXII is a front elevation of a split cutter-head, detached, applicable to the continuous form of feed-screw shaft shown in Fig. I or Fig. II.

Fig. XXIII is an edge view of the same.

Referring to the numerals on the drawings, 1 indicates a base or pedestal upon which and preferably at right angles thereto is supported and secured in any suitable manner, a barrel 2, that has a journal bearing 3 in its end next to the pedestal 1, and is formed with a slight flare or reverse taper whose small end commences at the inner end of said bearing. A hopper 4 communicates with the small end of the hollow of the barrel from above. A shaft 5 extends from end to end of the barrel within which it is provided, preferably at intervals, with supporting members that carry it with freedom of rotation. The journal bearing 3 constitutes a terminal supporting member as aforesaid, and besides that three members 7, 8 and 9, of like function are illustrated.

The parts 7, 8, and 9, besides being supporting members to the shaft 5, are reduction-plates each being provided with discharge apertures, those of the plate 7, indicated by the numeral 10, being of larger capacity than those of the two remaining plates 8 and 9. Against the face of plate 7 nearer the journal bearing 3 is disposed a rotatable cutter-head 11, whose blades 12, work shearwise across the open edges of the apertures 10, in a manner well understood in the art. The shaft 5 being continuous from end to end demands that the intermediate plates and cutter-heads shall be of special construction, to wit, a split construction as shown, for example, in Figs. XX and XXI, and Figs XXII and XXIII, respectively, whereby said members are made applicable to such a shaft within a space 15 (see Fig. II for detail) wherewith the screw blade 16 that winds about and forms part of the shaft 5 is mutilated or interrupted. In Fig. I, two spaces 15 are provided in order to provide means for effecting the triple reduction for which the machine shown in that figure is intended, whereas the machine shown in Fig. II, being intended for duple reduction, requires only a single space 15. For purpose of distinction, the shaft in Fig. II is designated by the numeral 17. Except in respect to the duple reduction function required of the one and the triple reduction function required of the other, the only substantial difference between the shafts 17 and 5 is found in their respective lengths.

The ultimate reduction-plate 9 with which the shaft within the barrel 2 is in any case provided and cutter-head 20 need not be split but may correspond to any members of like function such as are well known in the art, the plate 9 being provided with a cylindrical journal bearing 21 for the rotative accommodation of a terminal spindle 22 on the shaft, and the head 20 being provided with an angular aperture 23 corresponding to a like angular section 24 on the end of the feed-screw.

Each of the spaces 15, whatever their number, is made in every one-piece feed-screw by omission or the cutting of it away to form a journal 25 and an angular section 26 corresponding, respectively, to the terminal spindle 22 and angular section 24 aforesaid. Each intermediate reduction-plate intended for use upon a one-piece feed-screw is, as has been specified, split so as to admit of its application to the journal 25.

A suitable split plate construction is shown in Figs. XX and XXI, wherein countersunk tap screws 28 are used to unite two semi-circular halves to form an entire plate. An example of split construction of cutter-head adapted to be applied about section 26 of a single piece feed-screw is shown in Figs. XXII and XXIII wherein the two halves thereof are shown as hinged together on one side at 30 and as united on the other side by a tap screw 31.

The necessity for the split construction of reduction-plate and of cutter-head is obviated by employment of a sectional feed-screw as shown, for example in Figs. III and VI to X, inclusive. In such case while the feed-screw is as a whole provided in effect with spaces 15 and with journal 25 and angular section 26, it is by reason of its sectional construction, adapted to accept a reduction-plate corresponding, in respect to its being of one piece, to the plate 9. Any suitable means for coaxially uniting the feed-screw sections end to end may be employed, two forms thereof being shown by way of example in the drawings and described as follows: In Figs. III, VI, VII and VIII, a two-part feed-screw is shown in which one section is provided with a coaxial recess 32 in one end and the other section is provided with a corresponding coaxial slip-pin 33 to fit within the same.

In Figs. IX and X, a threaded aperture 34 otherwise corresponding to the recess 32 in one feed-screw section is shown for the accommodation of a terminally threaded coaxial pin 35 on the other section.

The reduction-plates, whether they be in one piece or in two, are represented by the plates 7, 8, and 9 in Fig. I, and in every instance one function thereof is, as has been specified, to support the feed-screw shaft. To that end the position of a reduction-plate within the barrel 2 should, in every instance of employment, be accurately determined and fixed. In respect to the ultimate reduction-plate 9 an annular screw-cap 36 may be used to hold it in place. If the barrel be in sections as shown, for example, in Fig. III, the intermediate reduction-plate may be secured in an internal annular recess provided for it between the two barrel sections 37 and 38, the latter being provided with an annular internally threaded coaxial flange for the reception of the threaded end of the section 37.

In all forms of barrel, I prefer to employ within the same, longitudinally disposed groove-defining ribs 40 against the edges of which the feed-screw blades 16 work substantially in close juxtaposition the working edges of said blades being constructed to fit the taper of the barrel. If the barrel be of one piece, I prefer to provide in said ribs, wherever need be, for accommodation of an intermediate reduction-plate, an annular recess adapted for close fitment within it of said plate, and to provide about the periphery thereof a bevel rim 41 suitably formed to engage one or more abutment screws 42 (as many as may be deemed necessary) which are obliquely disposed and threaded into apertures provided therefor in the body of the barrel 2.

In the construction shown in Fig. III, the screws 41 are unnecessary, their function being performed by pins 43 entered in a peripheral notch 44 in the plate as shown in Figs. XIV and XV for example. The discharge apertures of the reduction-plates whereof those of the plate 7 have been designated by the numeral 10 determine the size to which the particles must be reduced in order to pass through them.

In Fig. I, three reduction-plates are indicated in respect to the sizes of their respective discharge apertures (not shown) to provide for the gradual reduction of the load of the machines to the degree of fineness desired in the final product. In the successive reduction-plates, apertures of graduated sizes may be used, as indicated by the numeral 45, for example, in Fig. XV, or as indicated by the numeral 48 in Fig. XVII. The ultimate reduction-plate is, as a rule, always provided with a multiplicity of comparatively small gauge apertures 49, as shown, for example, in Figs. XVI and XVIII.

In order to provide, however, if desired, for the discharge of the machine into a sausage skin as a final container, which provision comes within the purview of my invention as applied to the art, it is desirable to employ a stuffer terminal-fixture which, as shown in Fig. IV, may consist of a cone 50 provided with an annular base flange 51 by which it may be fixed to the end of the barrel or barrel section as by an annular collar 52 threaded to the end thereof and capping the flange 51. If the said fixture is used it is desirable to employ a special terminal plate 53 next adjacent to the flange 51 distinguished by a journal bearing 54 for accommodation and support of the terminal spindle of the feed-screw shaft and by wide discharge apertures 55, such as are shown for example, in Fig. XIX. The provision of large discharge apertures 55 facilitates the proper delivery of the sausage-meat into the skins under the drive obtained through the feed of the coarse cut meat into the hopper as has been heretofore specified.

By aid of the construction shown in Fig. III one machine is made extensible from a single reduction machine to a plural reduction machine or vice versa, thereby enlarging the utility and enhancing the value thereof.

Having in the foregoing portion of this specification described the details of my invention in respect to my machine, and having alluded to my invention in so far as it appertains to the art to which it belongs, I add the following by way of further description of the operation of the machine and in further explication of my improvements in the art.

Referring, for example, to Figure I of the drawings, let it be assumed that the shaft 5 is being rotated in the right direction and at suitable speed as by means of a pulley on the driving end of said shaft (not illustrated) operatively communicating with a source of power (not illustrated).

Thereupon an attendant keeps the hopper fed with a supply of condiments and of meat, duly proportioned as to kind, including fat and lean, and cut into strips or pieces of suitable size, otherwise herein designated coarse-cut material. Said mixture of material is caught by the feed-screw comprising the winding blades 16 upon the shaft 5, and is, by reason of the coarseness of the material taken into the hopper, advanced with a certain and practically irresistible movement towards the blades of the revolving cutter head that work shearwise against the face of the reduction-plate 7. In this manner a first reduction of the meat and a mixing therewith of the condiments are effected.

The product of the first reduction is next forced, by the irresistible driving action, as aforesaid, of the feed-screw upon the coarse-cut material behind it, to pass through the apertures 10 of the plate 7, and beyond it to be taken up by the portion of the feed-screw that lies between the plates 7 and 8. Filling the space about the feed-screw between those plates and under the continued irresistible compulsion of said feed-screw, the product of the first reduction reaches the plate 8, and, having been subjected meanwhile to continued mixing action, is there subjected, in uninterrupted operation, to a second reduction by the cooperation of its cutter-head against it. Reductions following the first, with concurrent mixing action, may be multiplied to any desired extent, a third reduction being provided for in the machine shown in Fig. I. The gradual reduction of the coarse-cut material to the ultimate degree desired through successive reductions in one continuous operation constitutes one step of my process or improvement in the art. Another step therein consists in the utilization of the driving action of the coarse-cut material under compulsion of the feed-screw as a force-feed, to effect in one operation a plurality of successive reductions. Another step consists in the sanitary process wherein and whereby the forced feed referred to in the last sentence and the successive reductions in one operation consequent thereon, without intermediate handling, deliver meat and other ingredients from hopper to skin or other container in the form of properly ground, tempered and mixed sausage meat, ready, upon preparation in any way that may be usual or preferred, for the table.

What I claim is:

1. In a sausage-grinding machine, the combination with a regularly tapered barrel, its hopper, and its shaft provided with a feed-screw operatively mounted in the barrel and tapered to correspond to the barrel, of successive means of reduction operatively combined with said shaft within the barrel, substantially for the purpose specified.

2. In a sausage-grinding machine, the combination with a regularly tapered barrel, its hopper, and its shaft provided with a feed-screw operatively mounted in the barrel and tapered to correspond to the barrel, of a plurality of reduction-plates fixed at successive intervals within the barrel and cutters cooperative therewith, respectively, carried upon said shaft.

3. In a sausage-grinding machine, the combination with a sectional regularly tapered barrel and a sectional shaft whose sections collectively embody a feed-screw tapered to correspond with the barrel, of reduction-plates secured between sections of the barrel and revolubly supporting the shaft sections, and cutter-heads secured to the shaft and cooperative with the reduction-plates, respectively.

4. In a sausage-grinding machine, the combination with a regularly tapered barrel composed of a plurality of sections severally united by terminal screw-threads, of a shaft provided with a feed-screw within said barrel and tapered to fit the barrel, a reduction-plate fixed between abutting sections of the barrel, and a cutter-head carried by the feed-screw and cooperative with each reduction-plate, one cutter-head being provided for each reduction-plate.

5. In a sausage-grinding machine, the combination with a regularly tapered barrel, its hopper, feed-screw, shaft, reduction-plate, and cutter-head, of means for attaching an extension tapered to correspond with the taper of the barrel and a reduction-plate to the barrel, and means for attaching an extension and a cutter-head to the feed-screw shaft whereby assemblage of the parts described constitutes a feed-screw continuously tapered to correspond with the taper of the barrel and extension thereof, and effects a means for gradual reduction in one operation, as specified.

6. An improvement in machines for grinding sausage-meat, the combination with a barrel, its hopper, feed-screw, shaft, and a plurality of reduction-plates successively fixed within the barrel as supports for said shaft, cutter-heads upon the shaft cooperative with said reduction-plates, respectively, and a stuffer terminal-fixture, provided with a feed-screw continuation operatively mounted within the barrel of said fixture, a terminal-plate supporting the same within said fixture, and a cone operatively secured to the discharge end of said fixture.

In testimony whereof, I have hereunto set my hand in the presence of two subscribing witnesses.

JACOB EVERETT BENNETT.

Witnesses:
JOSEPH L. ATKINS,
SARAH Z. RILEA.